United States Patent
Solheid et al.

(10) Patent No.: US 9,002,166 B2
(45) Date of Patent: Apr. 7, 2015

(54) SLIDABLE FIBER OPTIC CONNECTION MODULE WITH CABLE SLACK MANAGEMENT

(71) Applicants: James J. Solheid, Lakeville, MN (US); Matthew Holmberg, Le Center, MN (US)

(72) Inventors: James J. Solheid, Lakeville, MN (US); Matthew Holmberg, Le Center, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 202 days.

(21) Appl. No.: 13/645,653

(22) Filed: Oct. 5, 2012

(65) Prior Publication Data

US 2013/0089297 A1    Apr. 11, 2013

Related U.S. Application Data

(60) Provisional application No. 61/544,939, filed on Oct. 7, 2011.

(51) Int. Cl.
  *G02B 6/00*    (2006.01)
  *G02B 6/44*    (2006.01)

(52) U.S. Cl.
  CPC .............. *G02B 6/444* (2013.01); *G02B 6/4455* (2013.01)

(58) Field of Classification Search
  USPC ......................................................... 385/135
  See application file for complete search history.

(56) References Cited

U.S. PATENT DOCUMENTS

| | | |
|---|---|---|
| 2,805,106 A | 9/1957 | Penkala |
| 2,864,656 A | 12/1958 | Yorinks |
| 3,901,564 A | 8/1975 | Armstrong |
| 4,070,076 A | 1/1978 | Zwillinger |
| 4,172,625 A | 10/1979 | Swain |
| 4,320,934 A | 3/1982 | Röck et al. |
| 4,359,262 A | 11/1982 | Dolan |
| 4,373,776 A | 2/1983 | Purdy |

(Continued)

FOREIGN PATENT DOCUMENTS

| | | |
|---|---|---|
| AU | 40995/85 | 4/1985 |
| AU | 55314/86 | 3/1986 |

(Continued)

OTHER PUBLICATIONS

"ITU Fiber Handbook" with English translation, 14 pages, Mar. 1992.

(Continued)

*Primary Examiner* — Hemang Sanghavi
(74) *Attorney, Agent, or Firm* — Merchant & Gould P.C.

(57) ABSTRACT

A fiber optic telecommunications device includes a frame and a fiber optic module. The fiber optic module includes a main housing portion defining fiber optic connection locations for connecting cables to be routed through the frame and a cable management portion for guiding cables between the main housing portion and the frame. The main housing portion of the fiber optic module is slidably mounted to the frame, the main housing portion slidable between a retracted position and an extended position along a sliding direction. The cable management portion of the fiber optic module includes a radius limiter slidably coupled to both the main housing portion and the frame. Movement of the main housing portion with respect to the frame moves the radius limiter with respect to the frame along the sliding direction and with respect to the main housing portion along a direction perpendicular to the sliding direction.

20 Claims, 16 Drawing Sheets

(56) References Cited

U.S. PATENT DOCUMENTS

| | | | |
|---|---|---|---|
| 4,494,806 A | 1/1985 | Williams et al. |
| 4,502,754 A | 3/1985 | Kawa |
| 4,585,303 A | 4/1986 | Pinsard et al. |
| 4,595,255 A | 6/1986 | Bhatt et al. |
| 4,630,886 A | 12/1986 | Lauriello et al. |
| 4,697,874 A | 10/1987 | Nozick |
| 4,699,455 A | 10/1987 | Erbe et al. |
| 4,708,430 A | 11/1987 | Donaldson et al. |
| 4,717,231 A | 1/1988 | Dewez et al. |
| 4,737,039 A | 4/1988 | Sekerich |
| 4,765,710 A | 8/1988 | Burmeister et al. |
| 4,792,203 A | 12/1988 | Nelson et al. |
| 4,820,007 A | 4/1989 | Ross et al. |
| 4,840,449 A | 6/1989 | Ghandeharizadeh |
| 4,898,448 A | 2/1990 | Cooper |
| 4,971,421 A | 11/1990 | Ori |
| 4,986,762 A | 1/1991 | Keith |
| 4,995,688 A | 2/1991 | Anton et al. |
| 5,024,498 A | 6/1991 | Becker et al. |
| 5,066,149 A | 11/1991 | Wheeler et al. |
| 5,067,678 A | 11/1991 | Henneberger et al. |
| 5,071,211 A | 12/1991 | Debortoli et al. |
| 5,100,221 A | 3/1992 | Carney et al. |
| 5,127,082 A | 6/1992 | Below et al. |
| 5,129,030 A | 7/1992 | Petrunia |
| 5,138,688 A | 8/1992 | Debortoli |
| 5,142,606 A | 8/1992 | Carney et al. |
| 5,142,607 A | 8/1992 | Petrotta et al. |
| 5,167,001 A | 11/1992 | Debortoli et al. |
| 5,174,675 A | 12/1992 | Martin |
| 5,240,209 A | 8/1993 | Kutsch |
| 5,247,603 A | 9/1993 | Vidacovich et al. |
| 5,275,064 A | 1/1994 | Hobbs |
| 5,285,515 A | 2/1994 | Milanowski et al. |
| 5,289,558 A | 2/1994 | Teichler et al. |
| 5,316,243 A | 5/1994 | Henneberger |
| 5,323,480 A | 6/1994 | Mullaney et al. |
| 5,335,349 A | 8/1994 | Kutsch et al. |
| 5,339,379 A | 8/1994 | Kutsch et al. |
| 5,353,367 A | 10/1994 | Czosnowski et al. |
| 5,363,466 A | 11/1994 | Milanowski et al. |
| 5,363,467 A | 11/1994 | Keith |
| 5,402,515 A | 3/1995 | Vidacovich et al. |
| 5,412,751 A | 5/1995 | Siemon et al. |
| 5,430,823 A | 7/1995 | Dupont et al. |
| 5,438,641 A | 8/1995 | Malacarne |
| 5,490,229 A | 2/1996 | Ghandeharizadeh et al. |
| 5,497,444 A | 3/1996 | Wheeler |
| 5,509,096 A | 4/1996 | Easley |
| 5,511,144 A | 4/1996 | Hawkins et al. |
| 5,530,783 A | 6/1996 | Belopolsky et al. |
| 5,570,450 A | 10/1996 | Fernandez et al. |
| 5,613,030 A | 3/1997 | Hoffer et al. |
| 5,640,481 A | 6/1997 | Llewellyn et al. |
| 5,655,044 A | 8/1997 | Finzel et al. |
| 5,717,810 A | 2/1998 | Wheeler |
| 5,724,469 A | 3/1998 | Orlando |
| 5,802,237 A | 9/1998 | Pulido |
| 5,811,055 A | 9/1998 | Geiger |
| 5,836,148 A | 11/1998 | Fukao |
| 5,882,100 A | 3/1999 | Rock |
| 5,887,106 A | 3/1999 | Cheeseman et al. |
| 5,917,984 A | 6/1999 | Röseler et al. |
| 5,923,753 A | 7/1999 | Haataja et al. |
| 5,946,440 A | 8/1999 | Puetz |
| 5,966,492 A | 10/1999 | Bechamps et al. |
| 5,971,626 A | 10/1999 | Knodell et al. |
| 5,975,769 A | 11/1999 | Larson et al. |
| 5,978,540 A | 11/1999 | Bechamps et al. |
| 6,009,224 A | 12/1999 | Allen |
| 6,022,150 A | 2/2000 | Erdman et al. |
| 6,027,252 A | 2/2000 | Erdman et al. |
| 6,044,194 A | 3/2000 | Meyerhoefer |
| 6,076,908 A | 6/2000 | Maffeo |
| 6,215,938 B1 | 4/2001 | Reitmeier et al. |
| 6,226,436 B1 | 5/2001 | Daoud et al. |
| 6,236,795 B1 | 5/2001 | Rodgers |
| 6,269,214 B1 | 7/2001 | Naudin et al. |
| 6,301,424 B1 | 10/2001 | Hwang |
| 6,360,050 B1 | 3/2002 | Moua et al. |
| 6,438,310 B1 | 8/2002 | Lance et al. |
| 6,439,523 B1 | 8/2002 | Chandler et al. |
| 6,496,638 B1 | 12/2002 | Andersen |
| 6,504,988 B1 | 1/2003 | Trebesch et al. |
| 6,591,051 B2 | 7/2003 | Solheid et al. |
| 6,594,434 B1 | 7/2003 | Davidson et al. |
| 6,600,866 B2 | 7/2003 | Gatica et al. |
| RE38,311 E | 11/2003 | Wheeler |
| 6,677,520 B1 | 1/2004 | Kim et al. |
| 6,715,619 B2 | 4/2004 | Kim et al. |
| 6,748,155 B2 | 6/2004 | Kim et al. |
| 6,768,860 B2 | 7/2004 | Liberty |
| 6,804,447 B2 | 10/2004 | Smith et al. |
| 6,809,258 B1 | 10/2004 | Dang et al. |
| 6,810,193 B1 | 10/2004 | Müller |
| 6,845,208 B2 | 1/2005 | Thibault et al. |
| 6,865,331 B2 | 3/2005 | Mertesdorf |
| 6,925,241 B2 | 8/2005 | Bohle et al. |
| 6,934,457 B2 | 8/2005 | Vincent et al. |
| 6,945,620 B2 | 9/2005 | Lam et al. |
| 6,968,111 B2 | 11/2005 | Trebesch et al. |
| 7,006,748 B2 | 2/2006 | Dagley et al. |
| 7,068,907 B2 | 6/2006 | Schray |
| 7,079,744 B2 | 7/2006 | Douglas et al. |
| 7,116,777 B2 | 10/2006 | Knudsen et al. |
| 7,120,348 B2 | 10/2006 | Trebesch et al. |
| 7,171,099 B2 | 1/2007 | Barnes et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,367,823 B2 | 5/2008 | Rapp et al. |
| 7,373,071 B2 | 5/2008 | Douglas et al. |
| 7,406,240 B2 | 7/2008 | Murano |
| 7,409,137 B2 | 8/2008 | Barnes |
| 7,460,757 B2 | 12/2008 | Hoehne et al. |
| 7,463,811 B2 | 12/2008 | Trebesch et al. |
| 7,496,268 B2 | 2/2009 | Escoto et al. |
| 7,499,623 B2 | 3/2009 | Barnes et al. |
| 7,664,361 B2 | 2/2010 | Trebesch et al. |
| 7,689,089 B2 | 3/2010 | Wagner et al. |
| 7,706,656 B2 | 4/2010 | Zimmel |
| 7,715,681 B2 | 5/2010 | Krampotich et al. |
| 7,747,125 B1 | 6/2010 | Lee et al. |
| RE41,460 E | 7/2010 | Wheeler |
| 7,751,674 B2 | 7/2010 | Hill |
| 7,764,859 B2 | 7/2010 | Krampotich et al. |
| 7,856,166 B2 | 12/2010 | Biribuze et al. |
| 7,869,683 B2 | 1/2011 | Barnes et al. |
| 7,876,993 B2 | 1/2011 | Krampotich et al. |
| 7,889,961 B2 | 2/2011 | Cote et al. |
| 8,027,558 B2 | 9/2011 | Barnes et al. |
| 8,059,932 B2 | 11/2011 | Hill et al. |
| 8,078,030 B2 | 12/2011 | Trebesch et al. |
| 8,195,022 B2 | 6/2012 | Coburn et al. |
| 8,285,104 B2 | 10/2012 | Davis et al. |
| 8,452,149 B2 | 5/2013 | Krampotich et al. |
| 8,559,785 B2 | 10/2013 | Barlowe et al. |
| 8,600,208 B2 | 12/2013 | Badar et al. |
| 8,639,081 B2 | 1/2014 | Barnes et al. |
| 8,655,136 B2 | 2/2014 | Trebesch et al. |
| 8,690,593 B2 | 4/2014 | Anderson et al. |
| 2001/0001270 A1 | 5/2001 | Williams Vigliaturo |
| 2002/0181922 A1 | 12/2002 | Xin et al. |
| 2003/0007767 A1 | 1/2003 | Douglas et al. |
| 2003/0128951 A1 | 7/2003 | Lecomte et al. |
| 2003/0165315 A1 | 9/2003 | Trebesch et al. |
| 2003/0174996 A1 | 9/2003 | Henschel et al. |
| 2003/0190035 A1 | 10/2003 | Knudsen et al. |
| 2004/0011750 A1 | 1/2004 | Kim et al. |
| 2004/0013390 A1* | 1/2004 | Kim et al. ............... 385/135 |
| 2004/0136676 A1* | 7/2004 | Mertesdorf ............... 385/135 |
| 2004/0175090 A1 | 9/2004 | Vastmans et al. |
| 2004/0258384 A1 | 12/2004 | Trebesch et al. |
| 2005/0025444 A1 | 2/2005 | Barnes et al. |

(56) References Cited

U.S. PATENT DOCUMENTS

| | | | |
|---|---|---|---|
| 2005/0058421 A1 | 3/2005 | Dagley et al. | |
| 2005/0078929 A1 | 4/2005 | Iwanek | |
| 2005/0100301 A1 | 5/2005 | Solheid et al. | |
| 2005/0123261 A1 | 6/2005 | Bellekens et al. | |
| 2006/0275008 A1 | 12/2006 | Xin | |
| 2007/0003204 A1 | 1/2007 | Makrides-Saravanos et al. | |
| 2007/0031099 A1 | 2/2007 | Herzog et al. | |
| 2007/0201806 A1 | 8/2007 | Douglas et al. | |
| 2008/0175550 A1 | 7/2008 | Coburn et al. | |
| 2009/0067800 A1 | 3/2009 | Vazquez et al. | |
| 2009/0067802 A1 | 3/2009 | Hoehne et al. | |
| 2009/0097813 A1 | 4/2009 | Hill | |
| 2009/0226142 A1* | 9/2009 | Barnes et al. | 385/135 |
| 2009/0274431 A1 | 11/2009 | Krampotich et al. | |
| 2010/0142910 A1 | 6/2010 | Hill et al. | |
| 2010/0158465 A1 | 6/2010 | Smrha | |
| 2010/0266253 A1 | 10/2010 | Krampotich et al. | |
| 2010/0316346 A1 | 12/2010 | Krampotich et al. | |
| 2010/0322578 A1 | 12/2010 | Cooke et al. | |
| 2011/0188809 A1 | 8/2011 | LeBlanc et al. | |
| 2011/0211799 A1 | 9/2011 | Conner et al. | |
| 2011/0217016 A1 | 9/2011 | Mullsteff | |
| 2011/0267794 A1 | 11/2011 | Anderson et al. | |
| 2011/0268404 A1 | 11/2011 | Cote et al. | |
| 2011/0268408 A1 | 11/2011 | Giraud et al. | |
| 2011/0268410 A1 | 11/2011 | Giraud et al. | |
| 2011/0268412 A1 | 11/2011 | Giraud et al. | |
| 2011/0286712 A1 | 11/2011 | Puetz et al. | |
| 2011/0317974 A1 | 12/2011 | Krampotich et al. | |
| 2012/0057838 A1 | 3/2012 | Hill et al. | |
| 2013/0089292 A1 | 4/2013 | Ott et al. | |
| 2013/0089298 A1* | 4/2013 | Holmberg et al. | 385/135 |
| 2013/0183018 A1 | 7/2013 | Holmberg | |
| 2013/0287356 A1 | 10/2013 | Solheid et al. | |
| 2014/0086545 A1* | 3/2014 | Solheid et al. | 385/135 |
| 2014/0133819 A1 | 5/2014 | Trebesch et al. | |

FOREIGN PATENT DOCUMENTS

| | | |
|---|---|---|
| DE | 2735106 | 2/1979 |
| DE | 2918309 | 11/1980 |
| DE | 3308682 | 9/1984 |
| DE | 3836273 | 4/1990 |
| DE | 4413136 | 5/1995 |
| DE | 29504191 | 3/1996 |
| EP | 0146478 | 6/1985 |
| EP | 0149250 | 7/1985 |
| EP | 0356942 | 3/1990 |
| EP | 0406151 | 1/1991 |
| EP | 0464570 | 1/1992 |
| EP | 0479226 | 4/1992 |
| EP | 0196102 | 3/1993 |
| EP | 0538164 | 4/1993 |
| EP | 0563995 | 10/1999 |
| FR | 2531576 | 2/1984 |
| FR | 2587127 | 3/1987 |
| FR | 2678076 | 12/1992 |
| JP | 59-74523 | 4/1984 |
| JP | 60-169811 | 9/1985 |
| JP | 61-55607 | 3/1986 |
| JP | 61-90104 | 5/1986 |
| KR | 200337929 | 1/2004 |
| KR | 20080033420 | 4/2008 |
| WO | WO 91/10927 | 7/1991 |
| WO | WO 95/07480 | 3/1995 |
| WO | WO 96/10203 | 4/1996 |
| WO | WO 99/00619 | 1/1999 |
| WO | WO 03/005095 | 1/2003 |

OTHER PUBLICATIONS

"Precision Mechanical" with English translation, 5 pages.
Northern Telecom Bulletin #91-004, Issue #2, May 1991.
AT&T Product Bulletin 2987D-DLH-7/89, "High Density Interconnect System (HDIC)," Issue 2 (Copyright 1989).
Preface to the book "Structure, Installation, Connection and Protection of Communication Optical Fiber Cable," in Chinese with English Translation, 14 pages (Mar. 1992).
Complaint relating to Civil Action No. 5:11-cv-02509-JS, *ADC Telecommunications, Inc* v. *Opterna Am, Inc.* filed Apr. 11, 2011 (14 pages).
Complaint relating to Civil Action No. 1:11cv-735 (GBL-IDD), *ADC Telecommunications, Inc* v. *Opterna Am, Inc.* filed Jul. 12, 2011 (5 pages).
Plaintiff's Notice of Dismissal relating to Civil Action No. 5:11-cv-02509-JS, *ADC Telecommunications, Inc* v. *Opterna Am, Inc.* filed Jul. 12, 2011 (1 page).
Stipulation and Order of Dismissal relating to Civil Action No. 1:11-cv-735-GBL-IDD, *ADC Telecommunications, Inc* v. *Opterna Am, Inc.* filed Feb. 21, 2012 (2 pages).

* cited by examiner

10

SLIDABLE FIBER OPTIC CONNECTION MODULE WITH CABLE SLACK MANAGEMENT

CROSS REFERENCE TO RELATED APPLICATION

This application claims the benefit of U.S. Provisional Patent Application Ser. No. 61/544,939, filed Oct. 7, 2011, which application is hereby incorporated by reference in its entirety.

TECHNICAL FIELD

The present disclosure relates generally to fiber optic telecommunications equipment. More specifically, the present disclosure relates to a fiber optic module designed for high density applications.

BACKGROUND

In telecommunications industry, the demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

An example of this type of equipment is found in U.S. Pat. No. 6,591,051 (the '051 patent) assigned to ADC Telecommunications, Inc. This patent concerns a high-density fiber distribution frame and high-density fiber termination blocks (FTBs) which are mounted to the frame. Because of the large number of optical fibers passing into and out of the FTBs, the frame and blocks have a variety of structures to organize and manage the fibers. Some structures are used to aid the fibers entering the back of the frame and FTBs. Other structures are provided for managing the cables leaving the FTBs on the front. The FTBs also include structures for facilitating access to the densely packed terminations. One such structure is a slidable adapter module that is incorporated into the FTBs to allow selective access to the densely packed terminations inside the FTBs.

Further development in such fiber termination systems is desired.

SUMMARY

The present disclosure relates to a fiber optic telecommunications device. The telecommunications device includes a slidable fiber optic connection module with features for cable slack management.

According to one example embodiment, a fiber optic telecommunications device includes a frame and a fiber optic module. The fiber optic module includes a main housing portion defining fiber optic connection locations for connecting cables to be routed through the frame and a cable management portion for guiding cables between the main housing portion and the frame. The main housing portion of the fiber optic module is slidably mounted to the frame, the main housing portion slidable between a retracted position and an extended position along a sliding direction. The cable management portion of the fiber optic module includes a radius limiter slidably coupled to both the main housing portion and the frame. Movement of the main housing portion with respect to the frame moves the radius limiter with respect to the frame along the sliding direction and with respect to the main housing portion along a direction perpendicular to the sliding direction.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

DETAILED DESCRIPTION

Reference will now be made in detail to examples of inventive aspects of the present disclosure which are illustrated in the accompanying drawings. Wherever possible, the same reference numbers will be used throughout the drawings to refer to the same or like parts.

FIGS. 1-14 illustrate a fiber optic connection module having features that are examples of inventive aspects in accordance with the present disclosure. The connection module can be mounted to a variety of telecommunications equipment. One such equipment is a high-density distribution frame as shown in FIGS. 1 and 1A of U.S. Provisional Application entitled SLIDABLE FIBER OPTIC CONNECTION MODULE WITH CABLE SLACK MANAGEMENT, filed on the same day as the present application and incorporated herein by reference in its entirety.

Figure 1:
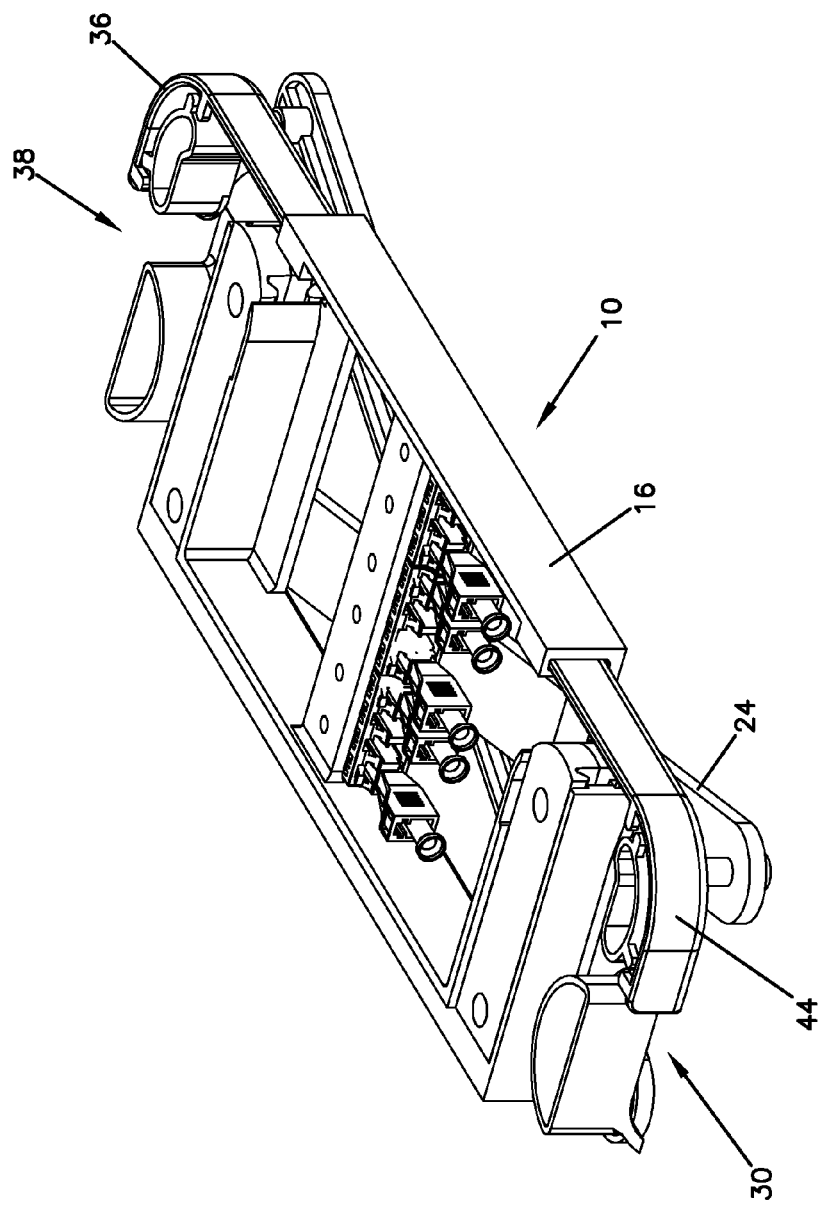
FIG. 1 is a front, top perspective view of a slidable fiber optic connection module having features that are examples of inventive aspects in accordance with the present disclosure, the connection module shown in a retracted position.
Figure 2:
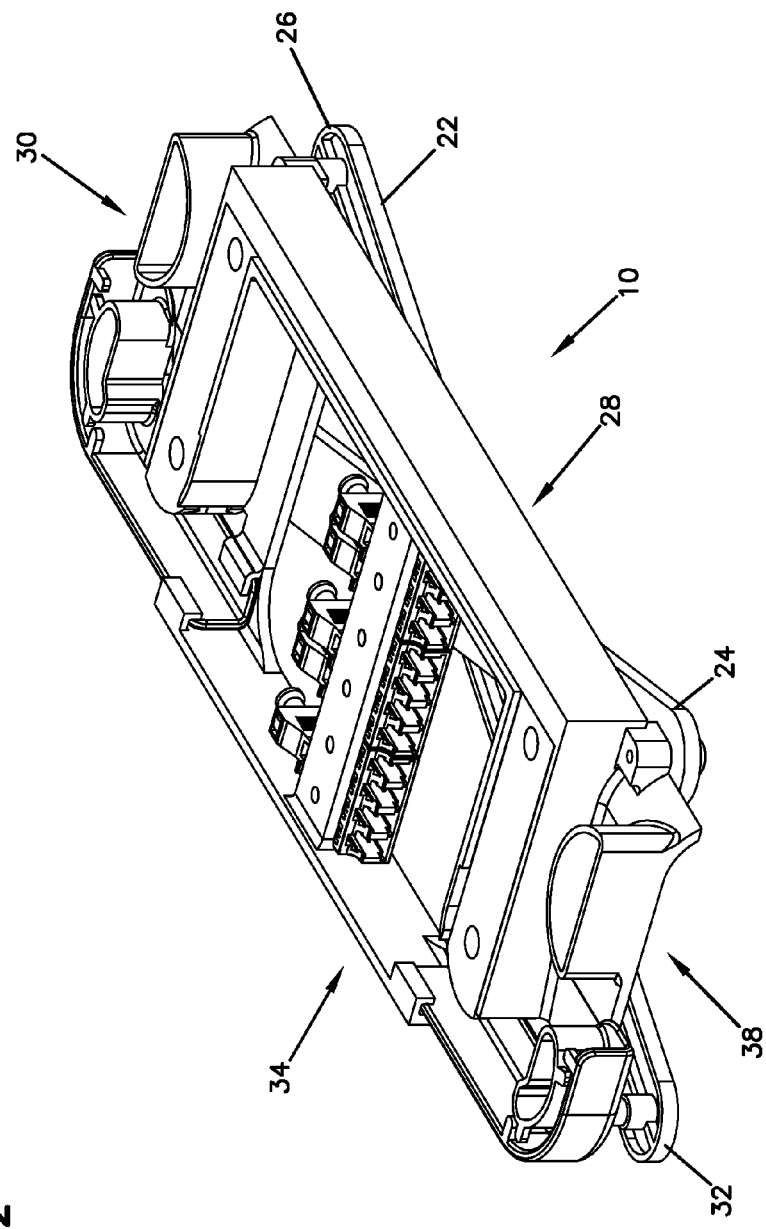
FIG. 2 is a rear, top perspective view of the fiber optic connection module of FIG. 1.
Figure 3:
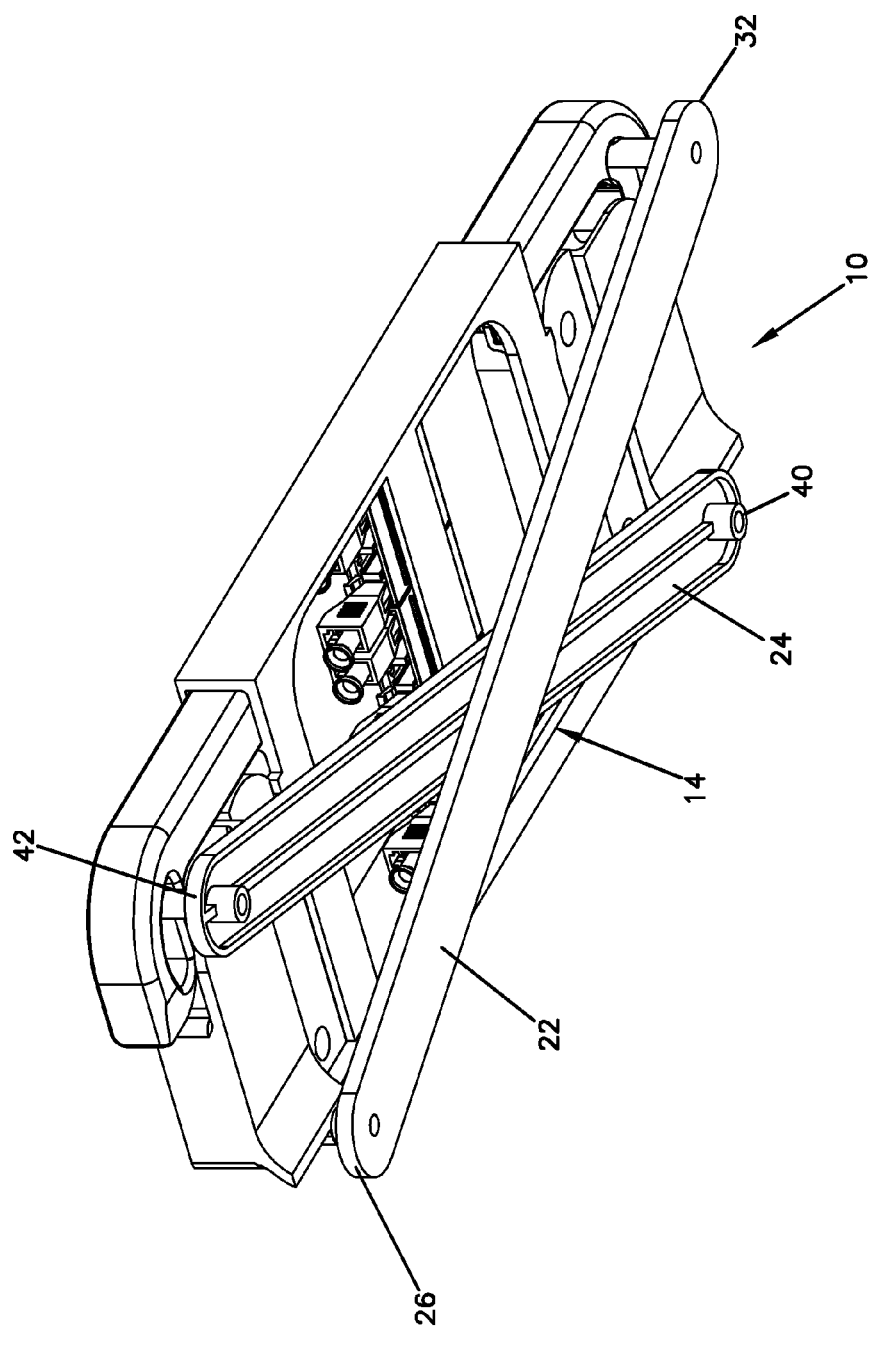
FIG. 3 is a front, bottom perspective view of the fiber optic connection module of FIG. 1.
Figure 4:
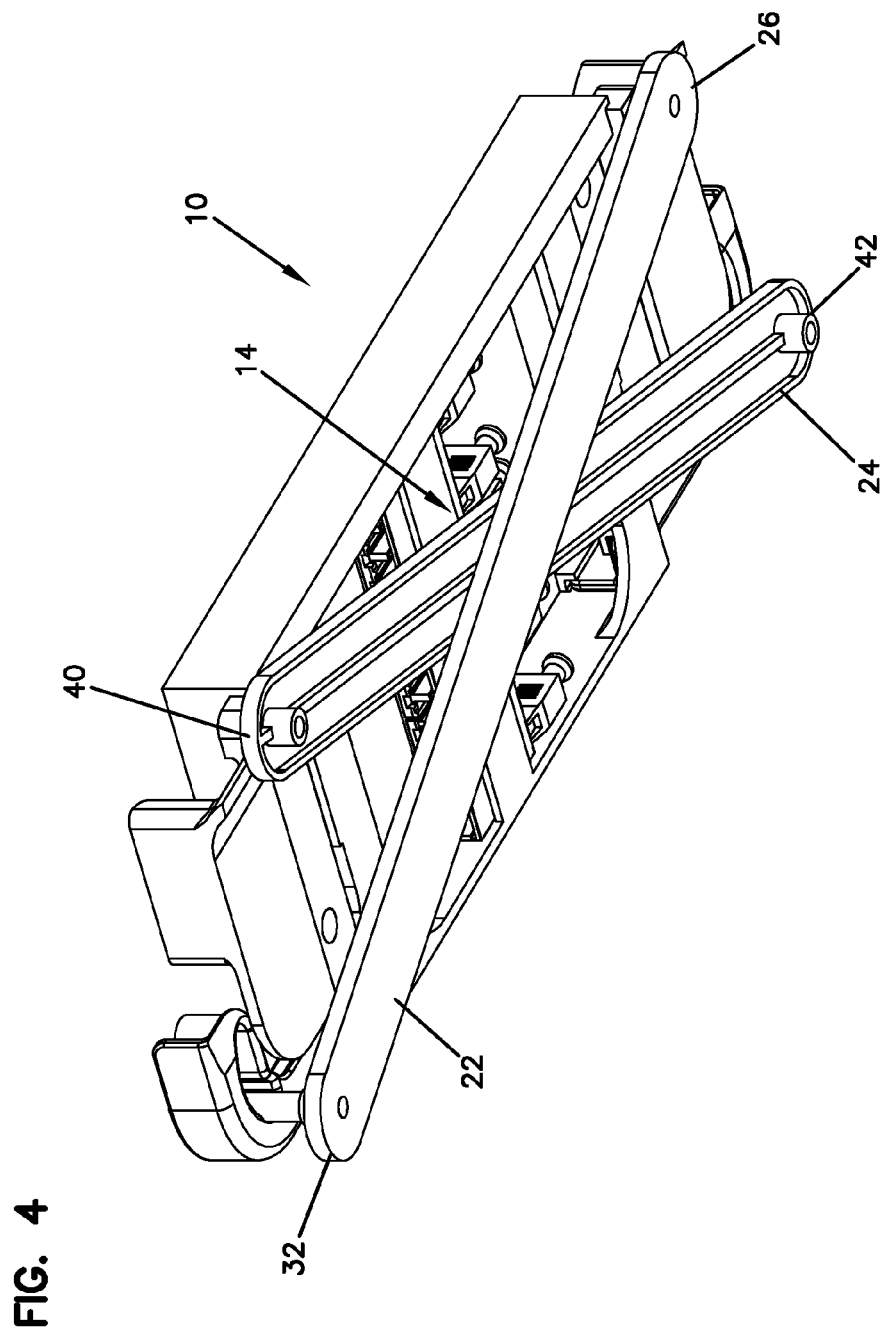
FIG. 4 is a rear, bottom perspective view of the fiber optic connection module of FIG. 1.
Figure 5:
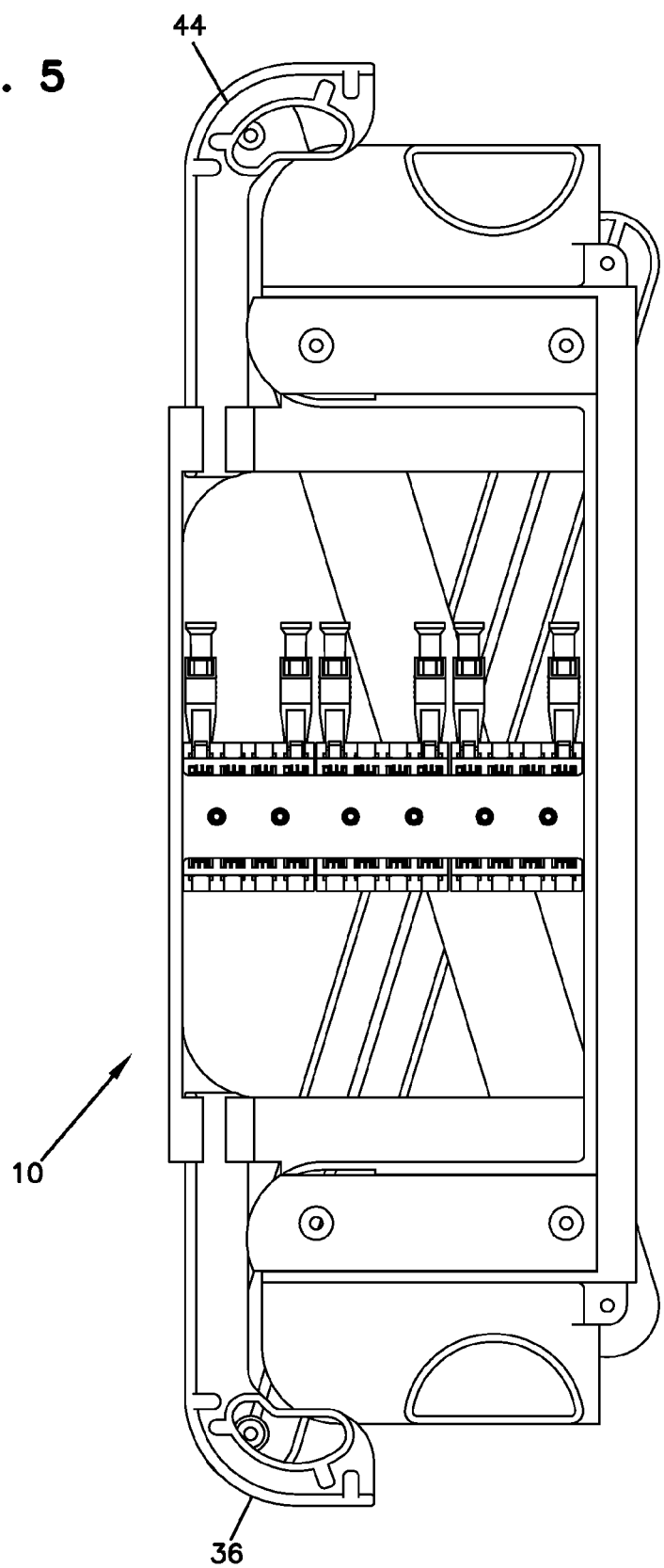
FIG. 5 is a top view of the fiber optic connection module of FIG. 1.
Figure 6:
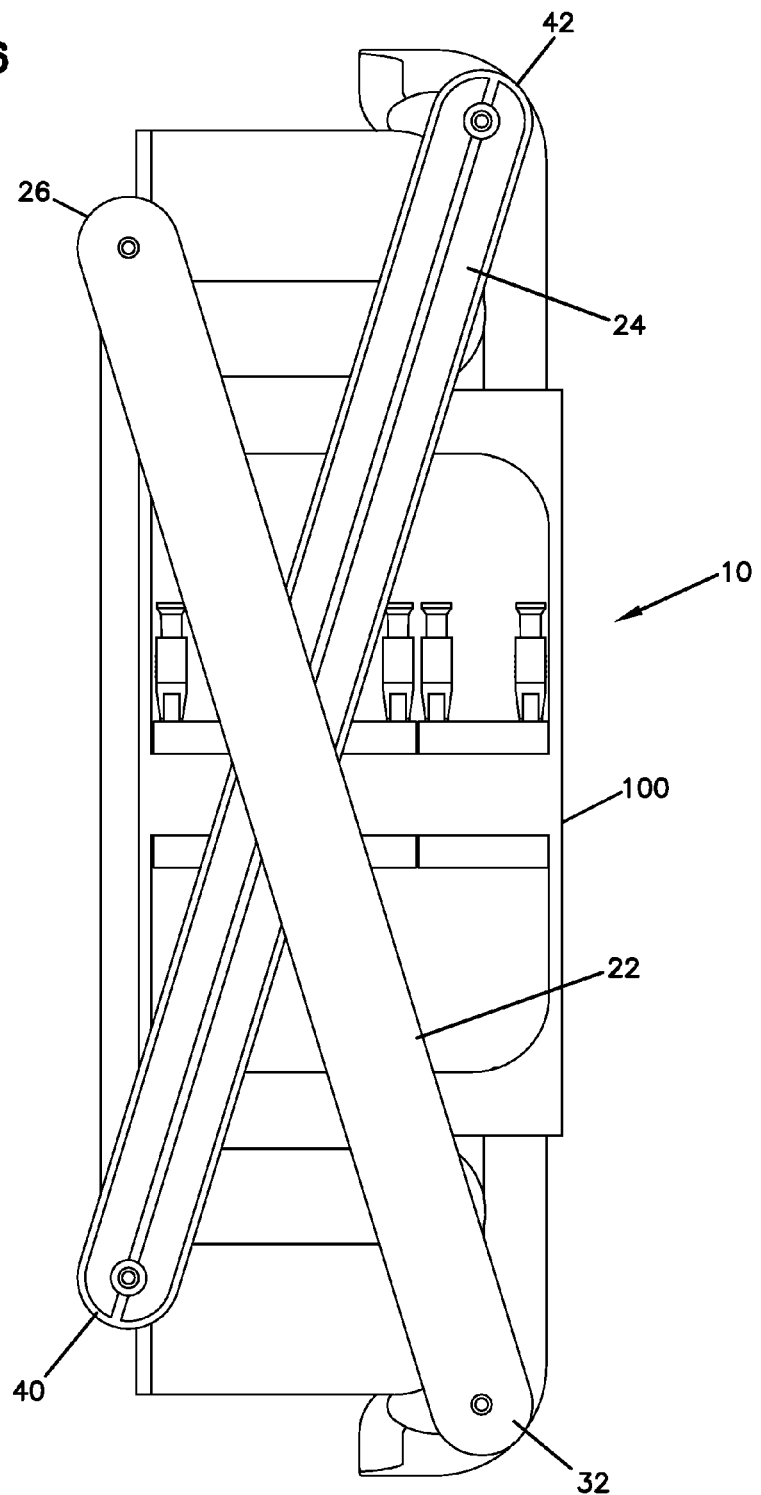
FIG. 6 is a bottom view of the fiber optic connection module of FIG. 1.
Figure 7:
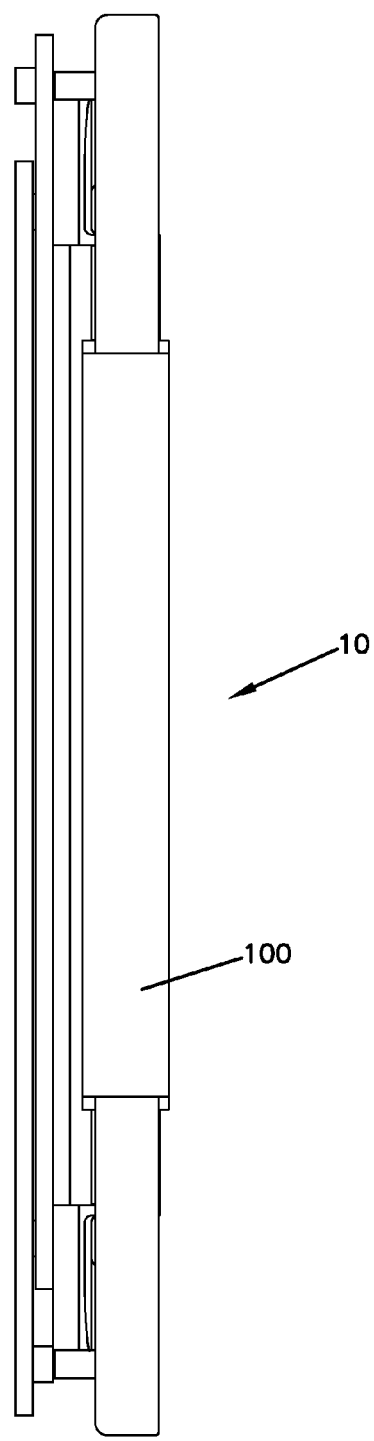
FIG. 7 is a front view of the fiber optic connection module of FIG. 1.
Figure 8:
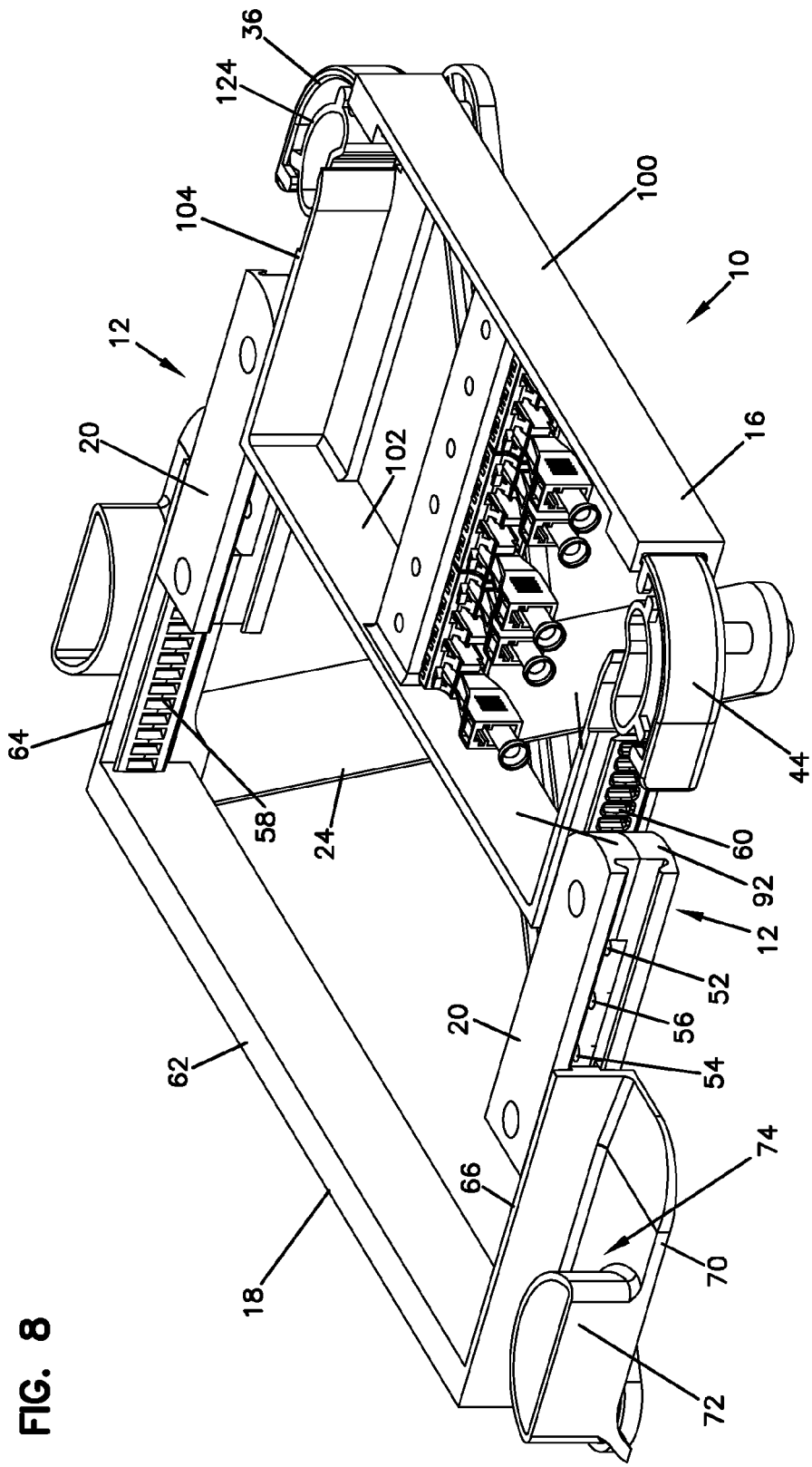
FIG. 8 illustrates the fiber optic connection module of FIG. 1 in a fully extended position.
Figure 9:
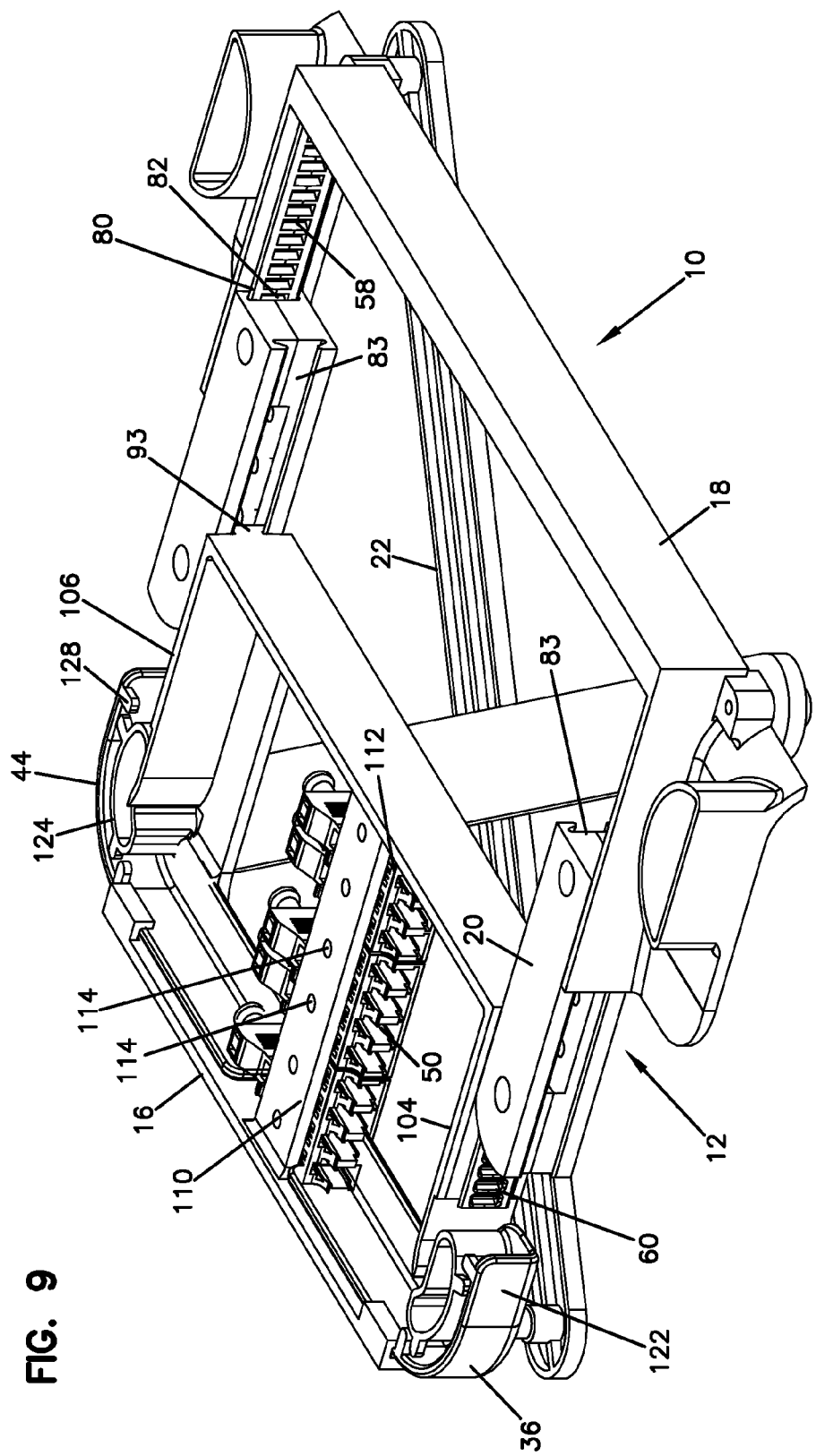
FIG. 9 illustrates the fiber optic connection module of FIG. 2 in a fully extended position.
Figure 10:
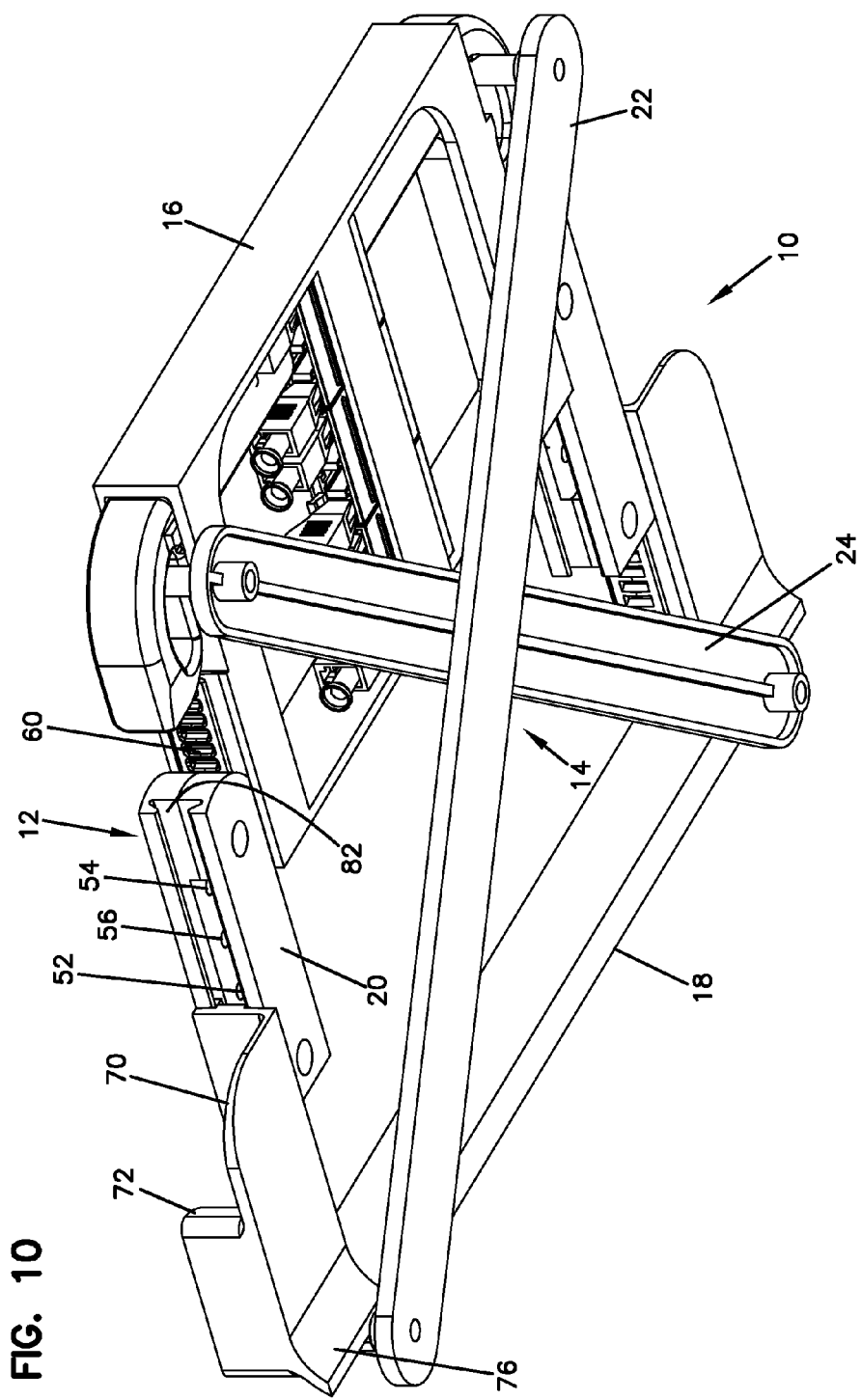
FIG. 10 illustrates the fiber optic connection module of FIG. 3 in a fully extended position.
Figure 11:
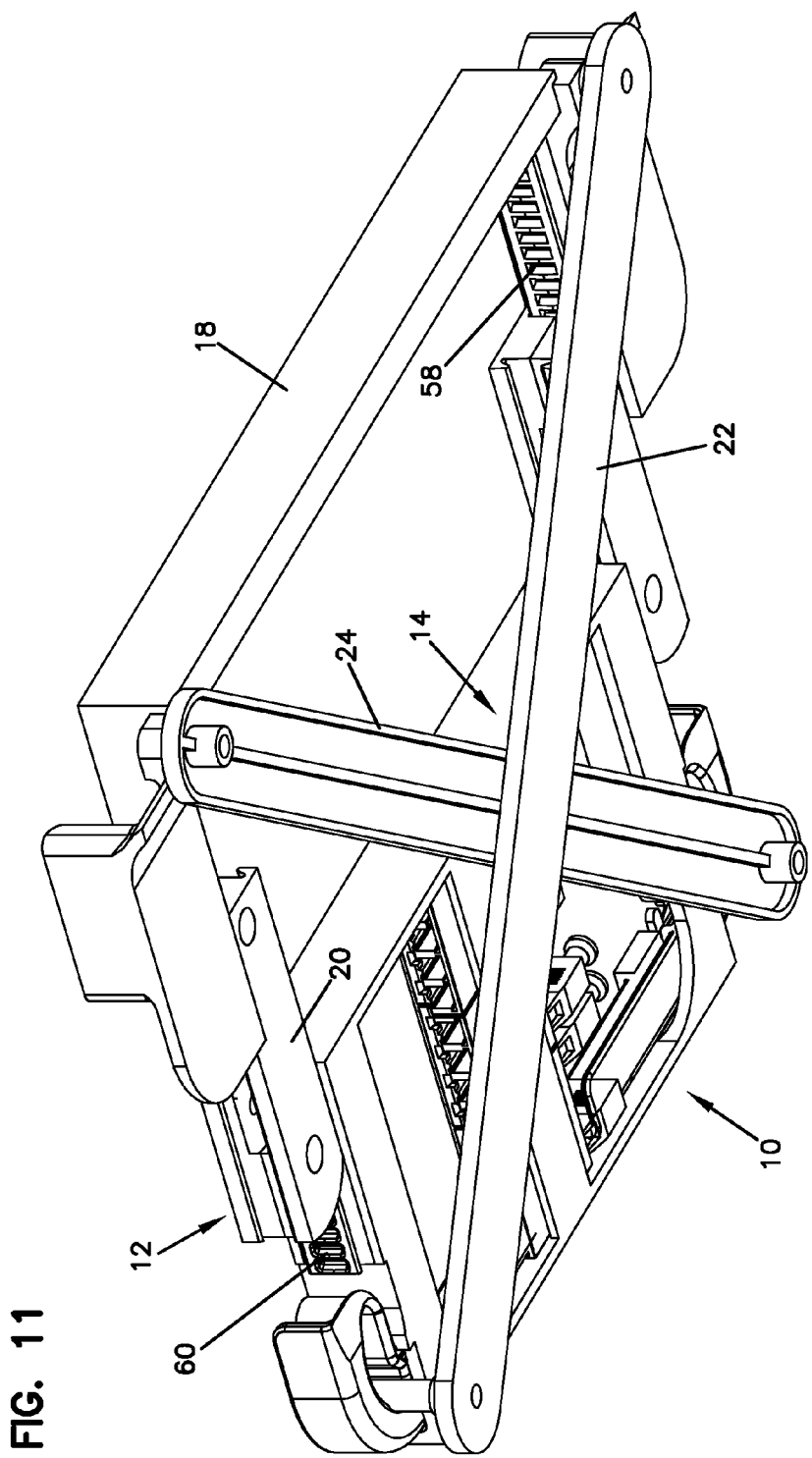
FIG. 11 illustrates the fiber optic connection module of FIG. 4 in a fully extended position.
Figure 12:
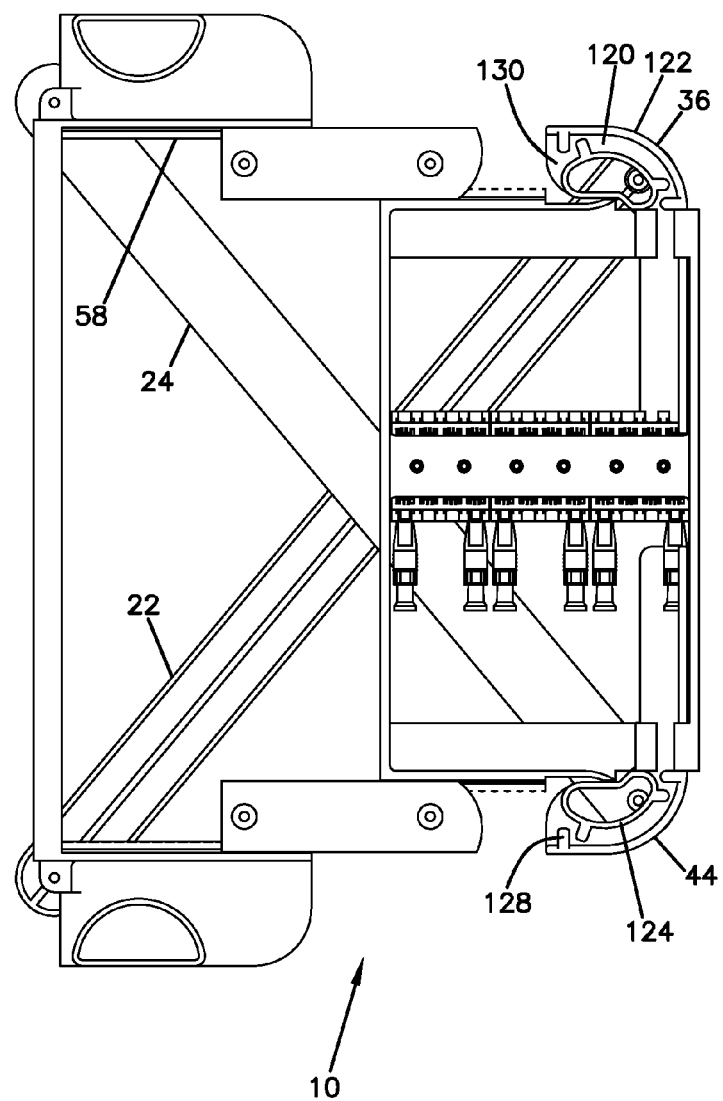
FIG. 12 illustrates the fiber optic connection module of FIG. 5 in a fully extended position.
Figure 13:
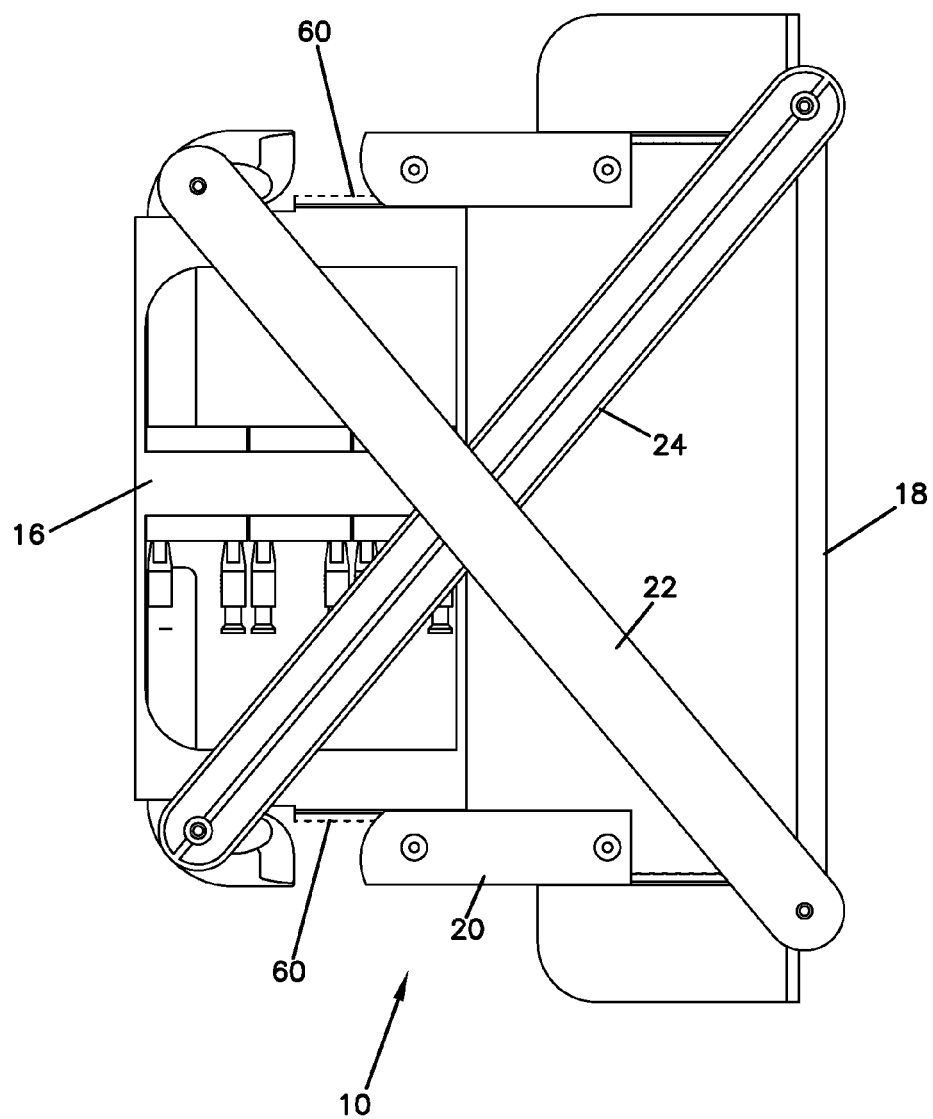
FIG. 13 illustrates the fiber optic connection module of FIG. 6 in a fully extended position.
Figure 14:
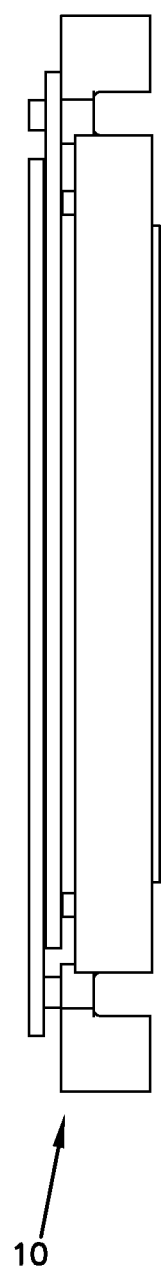
FIG. 14 is a rear view of the fiber optic connection module of FIG. 1, the connection module shown in an extended position.

The high-density distribution frame illustrated in FIGS. 1 and 1A of U.S. Provisional Application defines a front side, a rear side, a right side and a left side. A connection module such as module 10 described in the present application can be mounted on the high-density distribution in a stacked arrangement with similar other modules. As will be described in further detail below, when mounted each of the connection modules 10 is configured to be separately slidable with respect to the high-density distribution frame between a retracted position and an extended position for the purpose of accessing the fiber optic equipment located in or on the modules 10. The module 10 described in the present application can be mounted in a similar manner to those described in U.S. Provisional Application and can be mounted in a stacked arrangement both on the right side and the left side of a distribution frame. When mounted, connection modules 10 on the right side of the distribution frame can be slidably extendable in a direction from the left toward the right and the connection modules 10 on the left side can be slidably extendable in a direction from the right toward the left side of the distribution frame.

Figure 16:
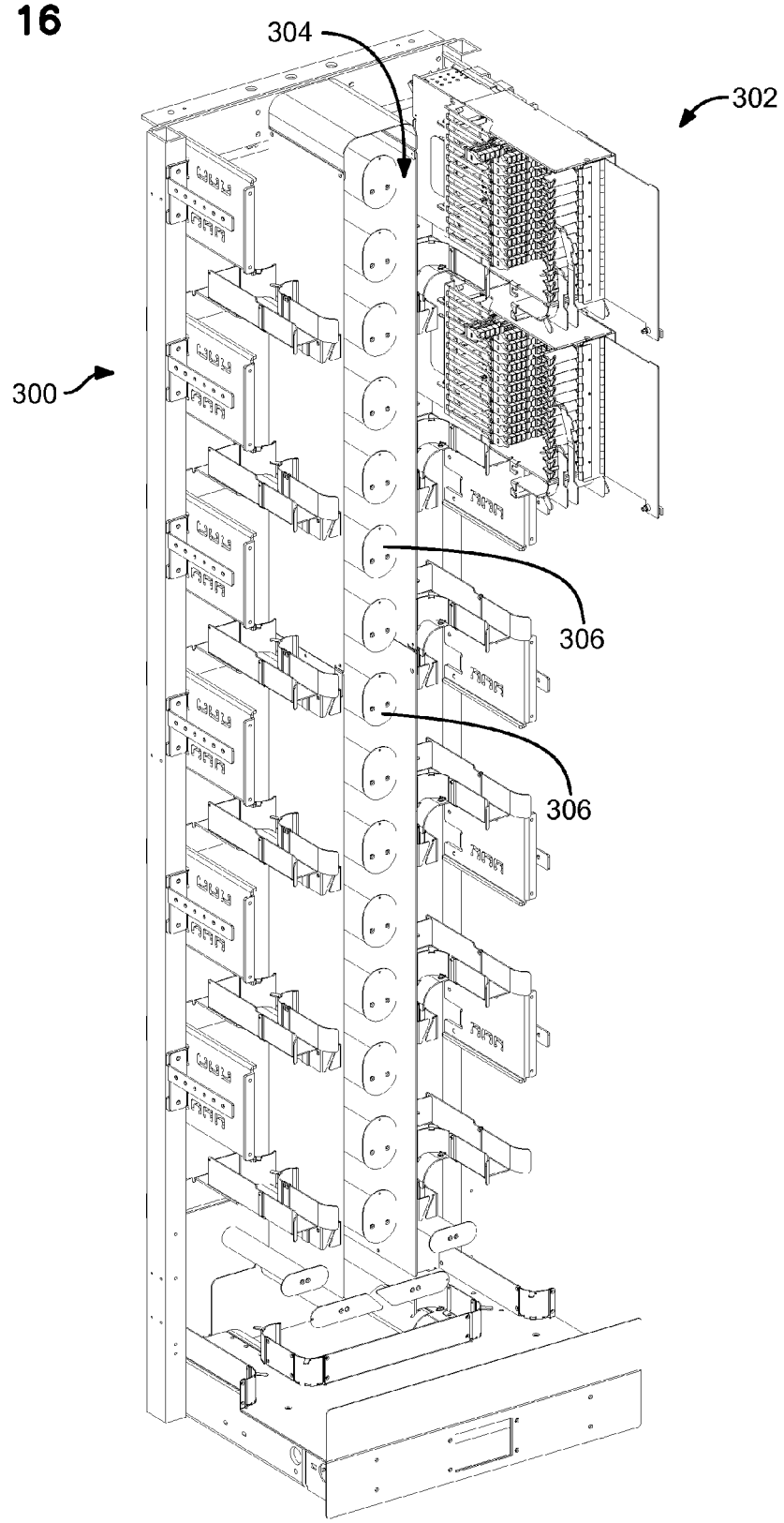
FIG. 16 illustrates a telecommunications rack with a plurality of prior art distribution frames or blocks mounted thereon.

It should be noted that the high-density fiber distribution frame or block illustrated in FIGS. 1 and 1A of U.S. Provisional Application may be used in a stacked arrangement in a telecommunications rack such as that described in U.S. Pat. No. 6,591,051, the disclosure of which is incorporated by reference herein in its entirety. Such a telecommunications rack 300 is also shown in FIG. 16 with a plurality of prior art distribution frames or blocks 302 mounted thereon in a stacked arrangement. The example rack defines a vertical cable path 304 with cable management structures 306 for leading cables away from and toward the distribution frames/blocks 302.

Still referring to FIGS. 1-14, the fiber optic connection module 10 is shown in isolation. The connection module 10 is shown in a retracted position in FIGS. 1-7 and in a fully extended position in FIGS. 8-14.

As shown, the connection module 10 utilizes a slide assembly 12 including a rack and pinion arrangement allowing the connection module 10 to be slidable between the refracted and extended positions. The connection module 10 also utilizes a linkage arrangement 14 configured to cause parts of the module 10 to move with respect to other parts of the module 10 for managing the slack in the cable routed through the module 10. The linkage arrangement 14 is configured such that when the connection module 10 is moved to the extended position, cables extending from a main frame member 16 of the connection module 10 toward the rear of the module 10 maintain a similar length and are not stressed or pulled during the travel of the main frame member 16. The linkage arrangement 14 is also configured such that when the connection module 10 is moved from the extended position to the retracted position, the linkage arrangement 14 causes cable management features located on different parts of the module 10 to relatively move with respect to each other, providing management of any slack in the cable to prevent pinching of the cables.

As will be discussed in further detail below, the connection module 10 utilizes a three-piece slide assembly 12. A rack mount portion 18 of the connection module 10 is the part of the module 10 that remains stationary with respect to the rest of the parts of the module 10. An intermediate center member 20, one located on each of the right and left sides of the module 10, provides the slidable connection between the main frame member 16 of the module 10 and the stationary rack mount member 18 of the module 10. Each center member 20 includes the gears that mesh with the racks provided on the main frame member 16 and the rack mount member 18, causing the center member 20 to move with respect to both the main frame member 16 and the rack mount member 18. Due to the rack pinion arrangement, each center member 20 moves in the same direction as the main frame member 16, but at half the linear speed of the main frame member 16 with respect to the rack mount member 18.

The linkage arrangement 14 is defined by two linkage arms, a first linkage arm 22 and a second linkage arm 24, located underneath the rack mount member 18, the center members 20, and the main frame member 16 of the module 10. Each linkage arm 22, 24 extends diagonally across the module 10 and is independently movable relative to the other linkage arm. As will be described in further detail, the first linkage arm 22 is pivotally connected at a first end 26 at the back 28 of the module 10 to the rack mount member 18 at a left side 30 of the module 10 and is also pivotally connected at a second end 32 at the front 34 of the module 10 to a first cable management structure 36 at a right side 38 of the module 10. The second linkage arm 24 is pivotally connected at a first end 40 at the back 28 of the module 10 to the rack mount member 18 at a right side 38 of the module 10 and is also pivotally connected at a second end 42 at the front 34 of the module 10 to a second cable management structure 44 at a left side 30 of the module 10. In this configuration, as seen in FIGS. 3, 4, 10, 11, and 13, the first and second linkage arms 22, 24 provide an X-shaped configuration.

As will be discussed, each of the first and second cable management structures 36, 44 are slidably coupled to the main frame member 16 at the right and left sides 38, respectively, of the main frame member 16. As the main frame member 16 is extended or retracted, the main frame member 16 travels with the first and second cable management structures 36, 44. The linkage arms 22, 24, by being pivotally connected to the cable management structures 36, 44, cause the cable management structures 36, 44 to slide inwardly toward the cable connection locations 50 of the main frame member 16 (transversely along a right to left direction) during extension of the main frame member 16. The linkage arms 22, 24 also cause the cable management structures 36, 44 to slide outwardly away from the cable connection locations 50 of the main frame member 16 (transversely along a right to left direction) during the retraction of the main frame member 16.

As such, the linkage arrangement 14 provides synchronized movement for the cable management structures 36, 44 slidably coupled to the main frame member 16 relative to the main frame member 16 such that as the main frame member 16 is moved forwardly or rearwardly, the cable management structures 36, 44 are moved both forwardly or rearwardly with the main frame member 16 and also transversely with respect to the main frame member 16. Thus, synchronized movement of the cable management structures 36, 44 and the main frame member 16 ensures that cables routed from the connection locations 50 of the main frame member 16 maintain a similar length as they are routed from the connection locations 50 to the rear of the module to the rack mount member 18 and do not get stressed during extension or bunched during retraction. The cable management structures 36, 44 moving simultaneously with the main frame member 16 ensure that the cables do not bend too sharply when the main frame member 16 is being extended or refracted. The movement of the cable management structures 36, 44 manages any slack in the cables whether the main frame member 16 is pulled out or pushed in from telecommunications equipment such as the high distribution frame. If the cables were to bend too sharply or if the cables were stressed or pulled, loss of signal strength or loss of transmission may occur.

Still referring to FIGS. 1-14, each center member 20 includes a first gear 52, a second gear 54 and an idler gear 56 thereinbetween. The gears 52, 54, 56 are similar in nature to the gear arrangement shown and described in U.S. Provisional Application incorporated herein by reference. The idler gear 56 meshes with the first and second gears 52, 54 and is configured to transmit the rotational direction of the first gear 52 to the second gear 54 such that the first and second gears 52, 54 rotate in the same direction. As noted previously, the first and second gears 52, 54 mesh with a first rack 58 provided on each of the right and left sides of the rack mount member 18 and a second rack 60 provided on each of the right and left sides of the main frame member 16. The first, second, and idler gears 52, 54, 56 are configured to provide half speed linear movement for the center members 20 by rotational contact with both the first and second racks 58, 60. That is, when the main frame member 16 is slid relative to the rack mount member 18 (or the fiber distribution frame), the first gear 52, the second gear 54, and the idler gear 56 rotate between the first and second racks 58, 60 to permit the main frame member 16 to travel at full speed and to cause the center members 20 to travel at half speed similar to the configuration shown in U.S. Provisional Application incorporated herein by reference.

When the main frame member 16 is extended away from the distribution frame, the second rack 60 contacts and rotates the first and the second gears 52, 54 located on the center members 20. While the first and second gears 52, 54 are rotating, the first and second gears 52, 54 simultaneously contact the first rack 58 on each side of the rack mount member 18. This coupling starts to move each center member 20 with respect to both the main frame member 16 and the rack mount member 18, with the center member 20 moving at half the linear speed of the main frame member 16 with respect to the stationary rack mount member 18. As noted before, during the movement of the slide assembly 12, both the first and second gears 52, 54 are rotating simultaneously in the same direction via the idler gear 56, which is rotating in the opposite direction. When the connection module 10 is moved toward the refracted position, the movements of the gears 52, 54, 56 of the slide assembly 12 are reversed. The three-piece slide assembly 12 provides a consistent movement between the right side 38 of the module 10 and the left side 30 of the module 10 so that the first and second linkage arms 22, 24 can operate in the desired manner. The three-piece slide assembly 12 also provides a robust slidable connection in the front to back direction for the main frame member 16 with respect to the stationary rack mount member 18, using the center members 20 as solid support structures.

Still referring to FIGS. 1-14, the rack mount member 18 is generally a U-shaped structure defining a rear wall 62, a right sidewall 64, and a left sidewall 66. The rack mount member 18 is configured to be mounted to a piece of telecommunications equipment such as the high-density distribution frame through the rear wall 62. The rack mount member 18 of the slide assembly 12 is the part of the module 10 that stays stationary with respect to the rest of the module 10. As discussed above, each center member 20 and the main frame member 16 move with respect to the rack mount member 18 when the connection module 10 is extended or retracted.

Each of the right and left sidewalls 64, 66 of the rack mount member 18 includes a platform 70 extending outwardly therefrom. On each platform 70 is a radius limiter 72. Each radius limiter 72 cooperates with the right or the left sidewall 64, 66 to define a cable path 74. As cables are routed from the main frame member 16 toward the rack mount member 18, the cables pass through the cable path 74 and are lead down a ramp 76 at the back of the platform 70. It should be noted that features discussed with respect to one side of the rack mount member 18 are fully applicable to the other side of the rack mount member 18 and only one side of the rack mount member 18 will be discussed herein for ease of description.

Each of the right and left sidewalls 64, 66 of the rack mount member 16, on the side opposite from the cable path 74, defines a first longitudinal protrusion 80 that extends from the front to the rear of the rack mount member 18. The longitudinal protrusion 80 defines a dovetail shaped profile for slidable insertion into a first dovetail shaped longitudinal groove 82 of the center member 20 as shown in FIGS. 8-11. The dovetail shaped profiles provide for longitudinal slidable coupling between the rack mount member 18 and each center member 20 while preventing uncoupling of the two members in a direction perpendicular to the sliding direction.

The longitudinal protrusion 80 on each side of the rack mount member 18 also defines the first rack 58 on each side. As discussed previously, by meshing with both the first rack 58 on the rack mount member 18 and the second rack 60 on the main frame member 16 at the same time, the first and second gears 52, 54 located on the center member 20 allow the center member 20 to move simultaneously with the main frame member 16 but at half the linear speed of the main frame member 16.

The first and second linkage arms 22, 24 of the linkage arrangement 14 are attached at their first ends 26, 40, respectively, to the rack mount member 18. As noted above, each linkage arm 22, 24 extends diagonally across the module 10 and is independently movable relative to the other linkage arm. The first linkage arm 22 is pivotally connected at a first end 26 at the back 28 of the module 10 to the rack mount member 18 at a left side of the rack mount member 18. The second linkage arm 24 is pivotally connected at a first end 40 at the back 28 of the module 10 to the rack mount member 18 at a right side of the rack mount member 18. The first and second linkage arms 22, 24 are pivotally mounted to the rack mount member 18 via fasteners.

Regarding the center members 20 that slide with respect to the stationary rack mount member 18, each center member 20 of the slide assembly 12 of the connection module 10 may be formed from an upper half 90 and a lower half 92 that are fastened together to capture the gears within the center member 20. The first, second, and idler gears 52, 54, 56 are placed within each center member 20 via axial pins defined on each gear and openings defined on each of the lower and upper halves 92, 90 of the center member 20 as shown in detail in U.S. Provisional Application incorporated herein by reference. Once the gears 52, 54, 56 are placed within the openings of the lower half 92, the upper half 90 is fastened down to the lower half 92 and the gears are free to spin when they are not engaging either of the racks 58, 60.

When the main frame member 16 is pulled out with respect to the distribution frame or the rack mount member 18, the center member 20 (by the meshing of the gear teeth of the first and second gears 52, 54 with the first and second racks 58, 60) moves in the same direction with the main frame member 16 at half the linear speed of the main frame member 16.

When the upper and the lower halves 90, 92 of the center member 20 are fastened together, they also cooperatively define the first dovetail shaped longitudinal groove 82 formed on one side of the center member 20 and a second dovetail shaped longitudinal groove 83 formed on the opposite side of the center member 20 that is configured to receive longitudinal protrusions 93 of the main frame member 16.

Still referring to FIGS. 1-14, the main frame member 16 includes a front wall 100, a rear wall 102, a right sidewall 104, and a left sidewall 106. Each of the right and left sidewalls 104, 106 defines a longitudinal protrusion 93 similar to those of the rack mount member 18 for slidable coupling with the center members 20. Each of the longitudinal protrusions 93 of the right wall 104 and the left wall 106 defines a dovetail shaped profile for slidable insertion into the second dovetail shaped longitudinal groove 83 of the center member 20 as shown in FIGS. 8-13. The dovetail shaped profiles provide for longitudinal slidable coupling between each center member 20 and the main frame member 16 while preventing uncoupling of the two members in a direction perpendicular to the sliding direction.

The longitudinal protrusion 93 on each of the right and left sidewalls 104, 106 of the main frame member 16 also defines the second rack 60. As discussed previously, by meshing with both the first rack 58 on the rack mount member 18 and the second rack 60 on the main frame member 16 at the same time, the first and second gears 52, 54 located on the center member 20 allow the center member 20 to move at half linear speed simultaneously with the main frame member 16.

The main frame member 16 is configured to provide fiber optic connection locations 50 for the connection module 10. By stacking a plurality of the modules 10 on a distribution frame, density of connections for fiber optic transmission can be increased and the slidability of the modules 10 provides for easy access. As shown in FIGS. 1-14, the depicted version of the main frame member 16 includes a mount 110 for mounting fiber optic adapters 112 which defines the fiber optic connection locations 50 in this embodiment of the module 10. Specifically, in the module 10 shown and described in the present application, the fiber optic connection locations 50 are defined by adapters 112 having an LC type footprint. In the depicted embodiments, twelve LC adapters 112 are mounted to the mount via fasteners through fastener openings 114 defined on the mount 110.

It should be noted that other standards of fiber optic adapters 112 (such as SC adapters) can be mounted to the mount 110. Fiber optic adapters 112 are only one type of fiber optic equipment that provides connection locations 50 for the module 10 and the module 10 can be used with other types of fiber optic equipment. For example, equipment such as fiber optic splitters, couplers, multiplexers/demultiplexers, or other types of equipment wherein cables may be routed away from the connection locations 50 may be housed on the main frame member 16.

If fiber optic adapters are used, the connection locations may be defined by adapters individually mounted in the mount or may be defined by blocks that include integrally formed adapters. In other embodiments, the connection locations may be in the form of a cassette that includes fiber optic adapters on one side wherein the opposite side either has a multi-fiber connector or a cable extending outwardly therefrom, as described in further detail in U.S. Provisional Application entitled FIBER OPTIC CASSETTE, SYSTEM, AND METHOD, filed on the same day as the present application and incorporated herein by reference in its entirety.

As long as plurality of fiber optic cables or even a single fiber optic cable is being routed from the main frame member 16 all the way to the rack mount member 18, the linkage arrangement 14 of the module 10 provides access to those fiber optic terminations while managing the cable slack to prevent pinching and preventing pulling or stressing of the cables.

As noted previously, cable management structures 36, 44 are slidably mounted to the front wall 100 of the main frame member 16 at each of the right and left sides of the main frame member 16. Each of the cable management structures 36, 44 defines a generally L-shaped configuration formed from a horizontal wall 120 and a vertical wall 122. Each cable management structure 36, 44 includes a radius limiter 124 extending upwardly from the horizontal wall 120. The radius limiter 124 and the vertical wall 122 cooperatively define a cable path 130 that is configured to route cables from the connection locations 50 toward the radius limiters 72 of the rack mount member 18. The vertical wall portion 122 adjacent the radius limiter 124 is curved to match the curvature of the radius limiter 124 to preserve bending radius for the fibers. Each of the radius limiter 124 and the vertical wall 122 include cable management fingers 128 for keeping cables within the path 130.

As described above, each linkage arm 22, 24 extends diagonally across the module 10 and is independently movable relative to the other linkage arm. The first linkage arm 22 is pivotally connected at a second end 32 at the front of the module 10 to the first cable management structure 36 at a right side of the module 10 and the second linkage arm 24 is pivotally connected at a second end 42 at the front of the module 10 to the second cable management structure 44 at a left side of the module 10. In this configuration, as seen in FIGS. 3, 4, 10, 11, and 13, the first and second linkage arms 22, 24 provide an X-shaped configuration.

The linkage arms 22, 24 are not directly connected to the main frame member 16. The linkage arms 22, 24 enable the first and second cable management structures 36, 44 to slidably move with respect to the main frame member 16 as the main frame member 16 is extended or retracted.

As the main frame member 16 is extended or retracted, the main frame member 16 travels with the first and second cable management structures 36, 44. The linkage arms 22, 24, by being pivotally connected to the cable management structures 36, 44, cause the cable management structures 36, 44 to slide inwardly toward the cable connection locations 50 of the main frame member 16 (transversely along a right to left direction) during extension of the main frame member 16. The linkage arms 22, 24 also cause the cable management structures 36, 44 to slide outwardly away from the cable connection locations 50 of the main frame member 16 (transversely along a right to left direction) during the retraction of the main frame member 16.

The linkage arrangement 14 provides synchronized movement for the cable management structures 36, 44 slidably coupled to the main frame member 16 relative to the main frame member 16 such that as the main frame member 16 is moved forwardly or rearwardly, the cable management structures 36, 44 are moved both forwardly or rearwardly with the main frame member 16 and also transversely with respect to the main frame member 16. Thus, synchronized movement of the cable management structures 36, 44 and the main frame member 16 ensures that cables routed from the connection locations 50 of the main frame member 16 maintain a similar path length as they are routed from those connection locations 50 to the rear of the module 10 to the rack mount member 18 and do not get stressed during extension or bunched during retraction. The cable management structures 36, 44 moving simultaneously with the main frame member 16 ensure that the cables do not bend too sharply when the main frame member 16 is being extended or refracted. The movement of the cable management structures 36, 44 provides management of any slack in the cables whether the main frame member 16 is pulled out or pushed in from telecommunications equipment such as the high distribution frame.

As in the rack mount member 18, the first and second linkage arms 22, 24 are pivotally mounted to each of the first and second cable management structures 36, 44 via fasteners.

Figure 15:
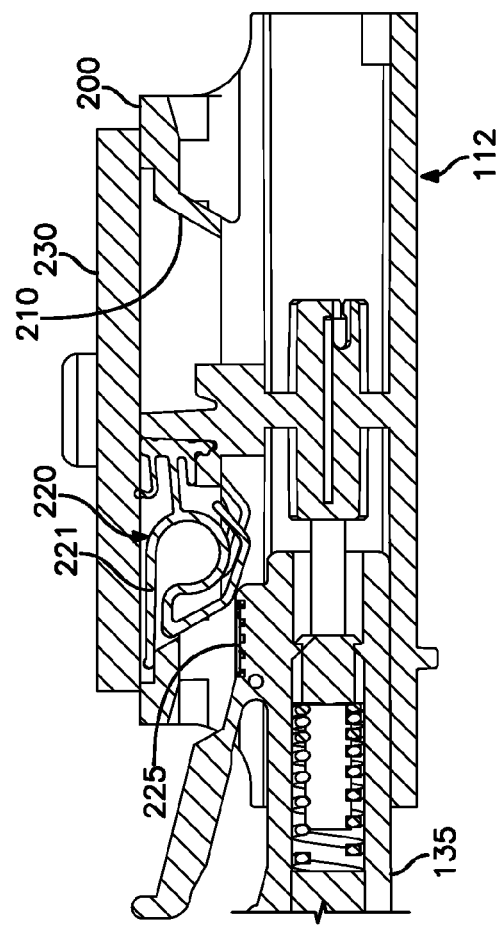
FIG. 15 is a cross-sectional view of an example adapter having a media reading interface configured to collect information stored in memory disposed on a fiber optic connector.

In accordance with some aspects, certain types of adapters 112 may be configured to collect physical layer information from one or more fiber optic connectors 135 received thereat. For example, as shown in FIG. 15, certain types of adapters 112 may include a body 200 configured to hold one or more media reading interfaces 220 that are configured to engage memory contacts on the fiber optic connectors 135. One or more media reading interfaces 220 may be positioned in the adapter body 200. In certain implementations, the adapter body 200 defines slots 210 extending between an exterior of the adapter body 200 and an internal passage in which the ferrules of the connectors 135 are received.

Certain types of media reading interfaces 220 include one or more contact members 221 that are positioned in the slots 210. As shown in FIG. 15, a portion of each contact member 221 extends into a respective one of the passages to engage memory contacts on a fiber optic connector 135. Another portion of each contact member 221 also extends out of the slot 210 to contact a circuit board 230. For example, the circuit board 230 may be coupled to the mount 110. Portions of the connection module 10 may define conductive paths that are configured to connect the media reading interfaces 220 of the adapter 112 with a master circuit board. The master circuit board may include or connect (e.g., over a network) to a processing unit that is configured to manage physical layer information obtained by the media reading interfaces.

Example adapters having media reading interfaces and example fiber optic connectors having suitable memory storage and memory contacts are shown in U.S. application Ser. No. 13/025,841, filed Feb. 11, 2011, titled "Managed Fiber Connectivity Systems," the disclosure of which is hereby incorporated herein by reference.

Although in the foregoing description, terms such as "top", "bottom", "front", "back", "right", "left", "upper", and "lower were used for ease of description and illustration, no restriction is intended by such use of the terms. The telecommunications devices described herein can be used in any orientation, depending upon the desired application.

Having described the preferred aspects and embodiments of the present invention, modifications and equivalents of the disclosed concepts may readily occur to one skilled in the art. However, it is intended that such modifications and equivalents be included within the scope of the claims which are appended hereto.

The invention claimed is:

1. A fiber optic telecommunications device comprising:
a telecommunications frame; and
a fiber optic module including a main frame member defining fiber optic connection locations for connecting cables to be routed through the telecommunications frame and a cable management portion for guiding cables between the main frame member and the telecommunications frame;
the main frame member of the fiber optic module slidably mounted to the telecommunications frame, the main frame member slidable between a retracted position and an extended position along a sliding direction;
the cable management portion of the fiber optic module including a radius limiter movably coupled to both the main frame member and the telecommunications frame, wherein movement of the main frame member with respect to the telecommunications frame moves the radius limiter with respect to the telecommunications frame along the sliding direction and with respect to the main frame member along a direction perpendicular to the sliding direction.

2. A fiber optic telecommunications device according to claim 1, wherein the fiber optic connection locations are defined by fiber optic adapters.

3. A fiber optic telecommunications device according to claim 1, wherein the fiber optic module includes a slide arrangement for slidably mounting the main frame member to the telecommunications frame, the slide arrangement defining a rack mount portion configured to mount the fiber optic module to the telecommunications frame and a center member that slidably connects the main frame member to the rack mount portion.

4. A fiber optic telecommunications device according to claim 3, wherein the slide arrangement includes a rack and pinion arrangement such that the center member moves at half the linear speed of the main frame member with respect to the rack mount member.

5. A fiber optic telecommunications device according to claim 4, wherein the rack and pinion arrangement defines at least one gear disposed on the center member that meshes with both a rack provided on the main frame member and a rack provided on the rack mount member.

6. A fiber optic telecommunications device according to claim 1, wherein the radius limiter of the fiber optic module is pivotally mounted to the telecommunications frame with a linkage arm so as to move in an arc with respect to the telecommunications frame.

7. A fiber optic telecommunications device according to claim 1, wherein the telecommunications frame is mounted on a telecommunications rack.

8. A fiber optic telecommunications device according to claim 1, wherein the fiber optic module defines a right side and a left side and includes a radius limiter movably coupled to the main frame member at both the right side and the left side, wherein movement of the main frame member with respect to the telecommunications frame moves the radius limiters at both the right side and the left side of the module with respect to the telecommunications frame along the sliding direction and with respect to the main frame member along the direction perpendicular to the sliding direction.

9. A fiber optic telecommunications device according to claim 8, wherein the fiber optic module includes a slide arrangement for slidably mounting the main frame member to the telecommunications frame at both the right side and the left side, each slide arrangement defining a rack mount portion configured to mount the fiber optic module to the telecommunications frame and a center member that slidably connects the main frame member to the rack mount portion.

10. A fiber optic telecommunications device according to claim 8, wherein the radius limiter at each of the right side and the left side of the fiber optic module is pivotally mounted to the telecommunications frame with a linkage arm so as to move in an arc with respect to the telecommunications frame, the linkage arms forming a generally "X" shaped configuration.

11. A fiber optic telecommunications device according to claim 1, wherein a plurality of the fiber optic modules are mounted to the telecommunications frame.

12. A fiber optic telecommunications device according to claim 2, wherein the fiber optic adapters are SC format adapters.

13. A fiber optic telecommunications module comprising:
a rack mount portion for mounting the module to a telecommunications fixture;

a main frame portion defining fiber optic connection locations for connecting cables to be routed through the module; and a center portion for slidably mounting the main frame portion to the rack mount portion between a retracted position and an extended position along a sliding direction;

wherein the main frame portion includes a cable management portion for guiding cables between the main frame portion and the rack mount portion, the cable management portion including a radius limiter movably coupled to both the main frame portion and the rack mount portion, wherein movement of the main frame portion with respect to the rack mount portion moves the radius limiter with respect to the rack mount portion along the sliding direction and with respect to the main frame portion along a direction perpendicular to the sliding direction.

14. A fiber optic telecommunications module according to claim 13, wherein the fiber optic connection locations are defined by fiber optic adapters.

15. A fiber optic telecommunications module according to claim 14, wherein the fiber optic adapters are SC format adapters.

16. A fiber optic telecommunications module according to claim 13, wherein the center portion moves at half the linear speed of the main frame portion with respect to the rack mount portion.

17. A fiber optic telecommunications module according to claim 13, wherein the main frame portion is slidably mounted to the rack mount portion via a rack and pinion arrangement that defines at least one gear disposed on the center portion that meshes with both a rack provided on the main frame portion and a rack provided on the rack mount portion.

18. A fiber optic telecommunications module according to claim 13, wherein the radius limiter of the fiber optic module is pivotally mounted to the rack mount portion with a linkage arm so as to move in an arc with respect to the rack mount portion.

19. A fiber optic telecommunications module according to claim 13, wherein the fiber optic module defines a right side and a left side and includes a radius limiter movably coupled to the main frame portion at both the right side and the left side, wherein movement of the main frame portion with respect to the rack mount portion moves the radius limiters at both the right side and the left side of the module with respect to the rack mount portion along the sliding direction and with respect to the main frame portion along the direction perpendicular to the sliding direction.

20. A fiber optic telecommunications module according to claim 19, wherein the radius limiter at each of the right side and the left side of the fiber optic module is pivotally mounted to the rack mount portion with a linkage arm so as to move in an arc with respect to the rack mount portion, the linkage arms forming a generally "X" shaped configuration.

* * * * *